Patented Mar. 7, 1944

2,343,430

UNITED STATES PATENT OFFICE 2,343,430

FILTER

Donald H. Wells, Maplewood, N. J., and Melvin De Groote, University City, Mo., assignors to Purolator Products, Inc., Newark, N. J., a corporation of Delaware No Drawing. Application February 28, 1941, Serial No. 381,121

21 Claims. (Cl. 252—326)

This invention relates to filtration and filters therefor and relates more particularly to filtration of lubricating oil of internal combustion engines for the removal of solids therefrom.

The lubricating oil of an internal combustion engine, particularly a Diesel type engine, contains minute solids which filtering media, such as cloth, paper, cotton linters, wood pulp and the like, require considerable time to remove. The dirt removal rate of such filtering media depends upon a number of different conditions such as, in depth type filters, the method of assembling the medium, the density of the packing of the medium, the distribution of the oil passing therethrough, temperature, pressure and a number of other variables. In filters of the extended area type, the amount of surface area, temperature, pressure, viscosity of the oil and other factors affect the dirt removal rate.

An object of this invention is to increase sharply the dirt removal rate of filtering media of the types above mentioned.

We have found that in filtering lubricating oils of internal combustion engines the dirt removal rate of filtering media may be sharply increased by contacting the oil that is filtered by the filtering medium with a product of esterification derived by reaction between an alkyl mono-hydroxy alcohol having at least 6 carbon atoms and a polybasic carboxylic acid. The ester product may be added to the filtering medium in order to increase the dirt removal rate of the filtering medium or may be contacted in some other way with oil passing through the filtering medium. Preferably the ester product is used according to this invention by including it in a filter for use in the lubricating system of an internal combustion engine so as to provide an improved filter having a high dirt removal rate.

Polybasic carboxy acids which may be employed in the esterification reaction may be exemplified by phthalic, succinic, malic, fumaric, citric, citriconic, maleic, adipic, tartaric, glutaric, diphenic, naphthalic, oxalic, or the like. The anhydrides of such polybasic carboxy acids such as phthalic anhydride, maleic anhydride, etc., are the equivalents of the acids and in some respects are even more advantageous than the acids in the production of esters. When reference is made to polybasic carboxy acids the anhydrides thereof are also included. Other suitable polybasic acids may be prepared by the diene synthesis, which involves condensation of alpha, beta unsaturated acids or anhydrides with compounds containing conjugated double bonds. For example, the condensation of maleic anhydride with alpha terpinene yields a dicarboxy acid which is suitable. Other polybasic carboxy acids may be prepared similarly by the diene synthesis involving condensation of alpha, beta unsaturated monocarboxy acid with a carboxy acid containing a conjugated double bond. For example, crotonic acid may be condensed with abietic acid, which contains a conjugated double bond, to yield a dicarboxy acid suitable for use in the manufacture of ester products in increasing the rate of dirt removal from lubricating oils in a filtering operation. Preferably the polybasic carboxy acid which is used is one having relatively high acidity, namely, having a dissociation constant or ionization constant K in the neighborhood of $7 \times 10^{-4}$ or greater. Citric acid has a dissociation or ionization constant that is slightly greater, namely, $8 \times 10^{-4}$ and the use of a polybasic carboxy acid whose acidity is at least equal to the acidity of citric acid is to be preferred. While polybasic carboxy acids such as adipic acid, pimelic acid, cuberic acid, etc., which have lesser acidity may be used, the use of polybasic carboxy acids having higher acidity of the order above referred to is to be preferred in the preparation of ester products suitable for increasing the filtering rate of filtering media. Functional equivalents of the polybasic carboxy acids, such as chlorphthalic acid, may be employed.

As mentioned above, alkyl mono-hydroxy alcohols having at least 6 carbon atoms may be employed in the preparation of ester products for use in increasing the filtering rate of filtering media according to this invention. Simple alphyl (aliphatic) high mol alcohols may be used, for example, hexyl alcohol, decanol, cetyl alcohol, octadecanol, and ceryl alcohol. Aralkyl alcohols likewise may be used, e. g. benzyl alcohol, naphthyl ethyl alcohol, naphthyl methyl alcohol, and the like. Alicyclic alcohols also are among the high mol monohydric alcohols which may be used. Cyclohexyl alcohol is representative of this class of alcohols as are also the similar alcohols in which the cyclohexyl radical is replaced by a nucleus obtained by hydrogenation of a naphthylene nucleus, e. g. a decalene nucleus. Suitable alcohols of very high molecular weight may be obtained by converting by conventional treatment branch chain aliphatic acids having 32 to 36 carbon atoms obtained by oxidation of petroleum to corresponding monohydric alcohols. Alcohols of the foregoing types are each to be regarded as comprising an alkyl group.

Mono-hydric alcohols, e. g. such as those mentioned above, may be treated with one or more mols, e. g. 1 to 4 mols, of alkylene oxides such as ethylene oxide, butylene oxide, propylene oxide, glycid and the like to obtain alkyl monohydric ether alcohols (containing an alkylene oxy group) which contain at least about 6 carbon atoms. It is preferable that such alkyl monohydric ether alcohols contain a hydrocarbon radical having at least 6 carbon atoms. In either event the alkyl group contains carbon atoms spaced by one or more oxygen atoms. It is to be understood that hydroxy aromatic compounds such as phenol, naphthol, etc., are not within the term alkyl as used herein. As aforesaid, aralkyl mono-hydric alcohols are suitable and are regarded as coming within the term alkyl. Substances such as benzyl alcohol above mentioned may be used and in addition aralkyl alcohol ethers may be used, e. g., produced by reacting a phenol such as naphthol with an alkylene oxide. The expression "alcohol" is not intended to include hydroxy acids or the like. The monohydric alcohol is preferably one that is substantially water-insoluble.

In reacting the polybasic carboxy acid with an alkyl mono-hydric alcohol containing at least 6 carbon atoms to form an ester product which may be used to increase the filtering rate of filtering media according to this invention, each of the carboxyl groups of the polybasic carboxy acid may react with the alcohol or alternatively less than all of the carboxyl groups of the acid may react with the alcohol. If less than all of the carboxyl groups react with an alkyl mono-hydric alcohol having at least 6 carbon atoms, the acid hydrogen of the remaining carboxyl group or groups may be left as it is or may be any other cation that has a univalent linkage with the carboxyl residue. Thus the acid hydrogen may be replaced by an alkyl group (including aliphatic, aromatic-aliphatic, and alicyclic alkyl groups) and even by an aryl group. Examples of suitable alcohols which may be used to replace the acid hydrogen are mono-hydric alcohols such as methyl, ethyl, propyl, butyl, and amyl, etc., and polyhydric alcohols such as ethylene, glycol, glycerol, erythriol, mannitol, sorbitol, mannitan, sorbitan, etc., ethyl trihydroxy chlorpalmitate, etc. The acid hydrogen may also be replaced by ammonia or by a metal and such compounds are referred to as salts. Monovalent metals such as sodium, potassium, etc., are included and likewise polyvalent metals such as calcium, iron, magnesium, aluminium, etc., which may, for example, replace the acid hydrogen of a plurality of free carboxyl groups in the same or different ester molecules and therefore become linked with the individual carboxyl residues by a univalent linkage. Similarly, a polyhydric alcohol such as glycol or glycerol may react with more than one residual carboxyl group to replace the acid hydrogen. The acid hydrogen may also be replaced by reaction with an amine, e. g. amyl amine, diamylamine, benzyl amine, cyclohexylamine, etc., or by reaction with an amino-alcohol such as ethanol amine, triethanolamine, aminoethyl propane diol, mono-, di- or tripropanol amine, etc., involving the alcoholic hydroxyl or simple neutralization. When reference is made to an ester product containing a free carboxyl group, it is intended that the product contain a COOH group in which the acid hydrogen has not been replaced. When reference is made to a carboxylic group the group may be in the acid form in which the acid hydrogen has not been replaced or may comprise some other atom or group replacing the acid hydrogen. The ester reaction is regarded as involving a polybasic carboxy or carboxylic acid whether the acid hydrogen of one or more of the carboxyl groups is replaced by a cation before or after the esterification reaction.

Somewhat more generally, if alkyl mono-hydric alcohols are indicated by the formula D.OH wherein D represents a monovalent alkyl radical having at least 6 carbon atoms and OH is the conventional hydroxyl radical, esters may be derived therefrom which may be used in increasing the filtering rate of filtering media according to this invention and which may be indicated by the generic formula:

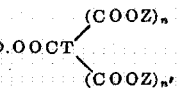

wherein D is the same as mentioned above; T represents a polybasic carboxy acid residue; $n$ is 0 or 1; $n'$ is 1; Z is any cation that has a univalent linkage with the carboxyl residue; and OOC (or COO) is the conventional carboxyl residue. As aforesaid the monovalent alkyl radical is preferably derived from a mono-hydric alcohol that is substantially water-insoluble.

Some of the ester products above defined are somewhat soluble in oil while others are substantially insoluble. If the ester product is such that only 1 part or less is soluble (as determined by usual visual methods) in ordinary straight-run kerosene from Pennsylvania crude, the product is to be regarded as substantially insoluble in oil. For use in increasing the filtering rate of filtering media according to this invention it is preferable that the ester product be substantially insoluble in oil. Most of the ester products hereinabove described are sub-resinous in character and of a tarry or balsam-like consistency. With some of the inter-reacting alkyl mono-hydric alcohols and polybasic acids it is possible by prolonged heating at relatively high temperatures to obtain a product that is of a hard horny character and lacks appreciable solubility in oil and in the lower aliphatic alcohols. Care should be taken not to produce such hard and totally oil-insoluble bodies. It may be mentioned, however, that even a trace of solubility such as a few parts dissolving in one hundred thousand parts of kerosene of the character above mentioned affords a satisfactory product for increasing the filtering rate of filtering media in the practice of this invention.

The production of the preferred ester products which are substantially oil-insoluble can be readily achieved having in mind the following factors which influence the oil solubility of the ester product. Thus oil solubility is decreased when the polybasic carboxy acid that is used in the esterification reaction has a minimum number of carbon atoms. For example, a product made using citric or maleic acid will have less oil solubility than a product derived by reaction with phthalic acid or naphthalic acid. Oil solubility is likewise decreased by utilizing an ether alcohol, namely, an alcohol containing an oxy alkylene group. For example, a product made from decanol will have greater oil solubility than a product made from decanol that has been previously reacted with ethylene oxide to afford an ether alcohol in which carbon atoms of the alkyl group are replaced by one or more oxygen atoms, and such products containing an oxy-alkylene group are to be preferred. Oil solubility is also affected by the nature of any substituent for the acid hydrogen of a residual carboxyl group of the polybasic carboxy acid that may be present. If the acid hydrogen is permitted to remain or is replaced by a metal or ammonia the ester product in such acid or salt form will have less solubility than if the acid hydrogen were replaced by reaction with a mono-hydric alcohol or a high mol amine. Ester products containing a free carboxyl group or a carboxylic group in the form of a salt are preferred for use in the practice of this invention. If the acid hydrogen is replaced by reaction with a polyhydric alcohol such as glycerol or with an amino-alcohol such as triethanol amine so that the group replacing the acid hydrogen is a hydroxylated organic group, oil solubility is decreased and such substances are preferred. Moreover when the acid hydrogen is replaced by an alkylene oxy group by reaction with an ether alcohol, oil solubility is decreased and such substances are preferred. While there are other factors affecting oil solubility the foregoing discussion is believed to be adequate to enable one to obtain ester products having desired properties of oil solubility. While it is preferable to employ ester products which are substantially insoluble in oil as defined above, those ester products which are more soluble in oil may likewise be employed.

Generally speaking the ester products hereinabove described are substantially water insoluble, namely, are not more soluble than 1 part in 1,000 parts of water at 50° to 80° F. Water solubility is not particularly important, however, because water in more than very small amounts ordinarily does not occur in the oil which is used in the lubricating system of an internal combustion engine and which is clarified by use of a filter. While some water solubility can be achieved by using a water soluble alcohol in the esterification reaction and repeated alkylation, this is ordinarily not done because it is regarded as prefferable to employ ester products which are totally or substantially water-insoluble for increasing the filtering rate of filtering media in the practice of this invention. In general it is preferable to employ in the preparation of the ester products mono-hydric high mole alcohols which are substantially water-insoluble as defined above. It also is preferable to employ an alcohol which contains a hydrocarbon group containing at least 6 carbon atoms.

In the preparation of esterification products adapted for use in increasing the rate of dirt removal in a filtration operation, the esterification reaction may be caused to take place readily upon the application of heat to the intimately commingled reacting materials, the reaction being the more rapid the higher the temperature that is employed, but care should be taken not to employ excessively high temperatures which would cause decomposition. The reaction may, if desired, be in the presence of an inert solvent such as xylene which may be removed after the completion of the reaction. When water results from the esterification reaction, the esterification reaction can be facilitated when an inert solvent such as xylene is employed by conducting the reaction under a reflux condenser using a water trap to remove water as it is formed. The reaction may also be hastened by passing through the reacting mixture a dried inert gas such as carbon dioxide or nitrogen which carries off water as it is formed. Generally speaking, however, the reaction takes place rapidly and completely by simply heating the substances to enter into the esterification reaction in desired stoichiometric proportions at a temperature above the boiling point of water, usually between about 110° to 160° C. provided there is no decomposition, and usually to a temperature above the melting point of the polybasic carboxy acid, e. g. to a temperature above the melting point of phthalic anhydride when this substance is employed.

The molecular weight of suitable ester products, as determined by cryoscopic methods or from the obvious composition of the ester, runs between about 300 and about 3000 and seldom is over about 5,000. Ester products having a molecular weight above about 10,000 are preferably not employed.

The preparation of an ester product suitable for use in increasing the filtering rate of filtering media in the practice of this invention may be illustrated in connection with the preparation of the ester product decyl hydrogen phthalate. A pound mole of decanol mixed with a pound mole of phthalic anhydride is heated in the presence of xylene under a reflux condenser. The reaction can be followed roughly by withdrawing a small sample of the partially reacted mass and permitting it to cool on a watch crystal. When the reaction has become completed no crystals of phthalic anhydride appear. As a further check a sample can be titrated against a standard volumetric alkaline solution, the reaction being complete when the acid number is substantially the theoretical acid number of the ester. After the reaction has been completed the ester product can be separated from the xylene as by distilling off the xylene.

In the foregoing example phthalic anhydride is employed and inasmuch as the anhydride reacts with the mono-hydric alcohol without forming water as a reaction product, the reaction will proceed rapidly to completion. For this reason the employment of polybasic carboxy acids in the anhydride form is usually preferable. If the polybasic carboxy acid is not used in the anhydride form water is produced as a reaction product and the reaction is hastened by removing the water as it is formed, e. g. in the ways hereinabove referred to, but this is not essential.

As another example of the preparation of an ester product suitable for use in increasing the filtering rate of filtering media, cetyl alcohol may be used in the esterification reaction instead of decanol, the procedure being essentially the same as that above described. By way of further example the decanol or cetyl alcohol of the preceding examples, prior to the esterification step may be treated with an alkylene oxide, e. g. with 1, 2 or 3 moles of ethylene oxide to form an ether alcohol which is then reacted with phthalic anhydride in the manner above described. Other polybasic carboxy acids, e. g., maleic anhydride, may be substituted for the phthalic anhydride mentioned in the preceding examples.

The products produced according to the foregoing examples are sub-resinous materials substantially insoluble in water and having low solubility, or substantial insolubility, in oil. The ester products are soluble in one or more of such solvents as the lower aliphatic alcohols (ethyl to octyl), chlorinated hydrocarbons such as dichlor ethyl ether, acetone and higher ketones, and dioxane.

The esterification product above described when used in conjunction with a filter in the filtering operation sharply increases the dirt removal rate of the filter. The product may be used in a number of different ways. Thus, in a paper type filter the product, either by itself or mixed with a solvent such as alcohol, preferably is applied to the surface of the paper covering all or a portion of the total paper surface exposed to oil. Cloth filters may be similarly treated. Cotton linters filters preferably are treated by adding the product either diluted or undiluted to cotton linters either on the surface or throughout the body thereof. Other filtering mediums sufficiently porous to permit oil to flow therethrough but sufficiently compact to filter out solid particles may be similarly treated. The product is also effective when incorporated in filters or filter mediums in other ways than those above mentioned. Moreover, whenever the product is permitted to contact oil that passes through the filtering medium it is effective to increase the rate of dirt removal by the filtering medium. Thus, if the product is applied to a screen or the like through or past which the oil passes before reaching the filtering medium, the dirt removal rate of the medium is increased. If the product is merely introduced into the casing within which the filtering medium is contained, it is effective.

The amount of the product that is used depends upon the increase in dirt removal rate that is desired. Ordinarily, for commercial purposes a small amount, such as about 2 to 25 grams, is all that is desirable for use in connection with a filter of proper size for the average automobile. Use of as little as 4 grams gives a very pronounced increase in dirt removal rate and the dirt removal rate is only slightly increased by using 5 or 6 times this amount.

As above mentioned, the use of an additive of the type above defined sharply increases the dirt removal rate. In other words, when a filtering operation is carried on using these additives in connection with a filter, a single filter can be made which can remove dirt as fast as the dirt could be removed by the use of a plurality of similar but untreated filters. In thus increasing the dirt removal rate, the improved result is secured chiefly through a greater removal of solids in a single passage through the filtering medium.

The improvements in the rate of dirt removal from lubrication oil that may be effected by the additives herein defined, have been tested by the following procedure. From a heated tank containing six quarts of oil, oil was withdrawn by a pump and forced continuously at 45 pounds per square inch pressure into a standard type automobile filter and the filtered oil was returned to the tank. Starting with clean oil, 5 grams of solids of the type formed in automobiles were added to the oil in the tank in such manner as to be thoroughly distributed throughout the oil in the tank, and observation was made of this oil to determine the number of minutes required to clean it to .02% solid content after each addition of the dirt. At two-hour intervals, additional 5-gram dirt charges were added and observations made of the length of time required to clean the oil in the tank to .02% solids after each dirt addition. Comparative tests were run with two sets of similar filters, the filters of one set being treated with the additive and the filters of the other set not being so treated. After each filter had reached the condition where oil in the tank contained .1% solids two hours after the dirt was added, the amount of dirt in the filter was determined by subtracting the amount of dirt remaining in the tank from the amount of dirt added during the test. The results for each set of filters were averaged. Using ester products above described, it was found that the treated filter cleaned up the first addition of dirt much more rapidly than the untreated filter and with subsequent dirt additions, the advantage in favor of the treated filter persisted. The life of the treated filter was not materially greater than that of the untreated filter.

According to this invention, additives that sharply increase the dirt removal rate of filtering media are made available which retain their effectiveness for the full life of the filter, withstand the temperatures encountered in internal combustion engine lubrication without volatilization, remain absorbed or deposited on the filtering medium during its use, and impart no injurious effects to the oil being filtered. The additive may be used without requiring any material change in the manufacture of the filter. Because of the faster dirt removal rate resulting from the use of the additive, the treated filter reduces the accumulation of solid particles and abrasive matter in the lubricant materially below that obtainable by a similar filter that has not been treated and thereby enhances the efficacy of the lubricant.

While this invention has been described in connection with a number of examples of products suitable for use in increasing the dirt removal rate of filtering media according to this invention, it is to be understood that this has been done merely for the purpose of illustration and exemplification and that the scope of this invention is to be governed by the language of the following claims considered in the light of the foregoing description.

We claim:

1. A filter for use in connection with the lubricating system of an internal combustion engine, said filter comprising a casing containing a filtering medium which is sufficiently porous to permit oil to flow therethrough but sufficiently compact to filter out solid particles, and said filter comprising for contact with oil passing therethrough an agent for increasing the dirt removal rate of said filtering medium, said agent comprising a product of esterfication reaction between an alkyl mono-hydroxy alcohol having at least 6 carbon atoms and a polybasic carboxylic acid.

2. A filter according to claim 1 wherein said product is substantially oil insoluble.

3. A filter according to claim 1 wherein said product is substantially oil insoluble and is substantially water insoluble.

4. A filter according to claim 1 wherein said alkyl monohydroxy alcohol contains at least 6 carbon atoms in a hydrocarbon group.

5. A filter according to claim 1 wherein said alkyl monohydroxy alcohol is substantially insoluble in water.

6. A filter according to claim 1 wherein said product is a product of esterification between an alkyl monohydroxy ether alcohol having at least 6 carbon atoms in a hydrocarbon group and a polybasic carboxy acid.

7. A filter according to claim 1 wherein said product contains an acid carboxylic radical.

8. A filter according to claim 1 wherein said product contains a free carboxyl group.

9. A filter according to claim 1 wherein said product contains a carboxylic group wherein the acid hydrogen is replaced by an oxy organic group.

10. A filter according to claim 1 wherein said product contains a carboxylic group wherein the acid hydrogen is replaced by an hydroxylated alkyl group.

11. A filter for use in connection with the lubricating system of an internal combustion engine, said filter comprising a casing containing a filtering medium which is sufficiently porous to permit oil to flow therethrough but sufficiently compact to filter out solid particles, and said filter comprising for contact with oil passing therethrough an agent for increasing the dirt removal rate of said filtering medium, said agent comprising a compound represented by the formula

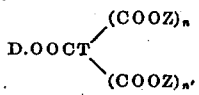

wherein D represents a monovalent alkyl radical having at least 6 carbon atoms; T represents a polybasic carboxylic acid residue; $n$ is 0 or 1; $n'$ is 1; Z represents and cation that has a univalent linkage with the carboxyl residue and OOC (or COO) is the conventional carboxyl residue.

12. A filter for use in connection with the lubricating system of an internal combustion engine comprising a casing containing a filtering medium sufficiently porous to permit oil to flow therethrough but sufficiently compact to filter out solid particles, said medium having applied thereto as an agent to increase the dirt removal rate of said filtering medium a product of esterification reaction between a substantially water-insoluble alkyl mono-hydroxy alcohol having at least 6 carbon atoms and a polybasic carboxylic acid.

13. A method of increasing the dirt removal rate of a filtering medium for removing dirt from the lubricating oil of an internal combustion engine, said method comprising contacting oil that is filtered by said filtering medium with a compound represented by the formula

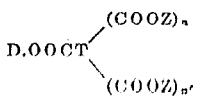

wherein D represents a monovalent alkyl radical having at least 6 carbon atoms; T represents a polybasic carboxylic acid residue; $n$ is 0 or 1; $n'$ is 1; Z represents any cation that has univalent linkage with the carboxyl residue; and OOC (or COO) is the conventional carboxyl residue.

14. A method of increasing the dirt removal rate of a filtering medium for removing dirt from the lubricating oil of an internal combustion engine, said method comprising contacting oil that is filtered by said filtering medium with a product of esterification reaction between an alkyl mono-hydroxy alcohol having at least 6 carbon atoms and a polybasic carboxylic acid.

15. A method according to claim 14 wherein said product is substantially oil insoluble.

16. A method according to claim 14 wherein said product is substantially oil insoluble and is substantially water insoluble.

17. A method according to claim 14 wherein said alkyl monohydroxy alcohol contains at least 6 carbon atoms in a hydrocarbon group.

18. A method according to claim 14 wherein said alkyl monohydroxy alcohol is substantially insoluble in water.

19. A method according to claim 14 wherein said product is a product of esterification between an alkyl mono-hydroxy ether alcohol having at least 6 carbon atoms in a hydrocarbon group and a polybasic carboxy acid.

20. A method according to claim 14 wherein said product contains an acid carboxylic radical 21. A method according to claim 14 wherein said product contains a free carboxyl group.

DONALD H. WELLS.
MELVIN DE GROOTE.

CERTIFICATE OF CORRECTION.

Patent No. 2,343,430.                                    March 7, 1944.

DONALD H. WELLS, ET AL.

It is hereby certified that error appears in the printed specification of the above numbered patent requiring correction as follows: Page 5, first column, line 25, claim 11, after "represents" strike out "and" and insert instead --any--; and that the said Letters Patent should be read with this correction therein that the same may conform to the record of the case in the Patent Office.

Signed and sealed this 9th day of May, A. D. 1944.

Leslie Frazer
(Seal)                                    Acting Commissioner of Patents.

CERTIFICATE OF CORRECTION.

Patent No. 2,343,430. March 7, 1944.

DONALD H. WELLS, ET AL.

It is hereby certified that error appears in the printed specification of the above numbered patent requiring correction as follows: Page 5, first column, line 25, claim 11, after "represents" strike out "and" and insert instead --any--; and that the said Letters Patent should be read with this correction therein that the same may conform to the record of the case in the Patent Office.

Signed and sealed this 9th day of May, A. D. 1944.

Leslie Frazer (Seal) Acting Commissioner of Patents.